(12) United States Patent
Kadambe et al.

(10) Patent No.: US 8,396,310 B1
(45) Date of Patent: Mar. 12, 2013

(54) BASIS LEARNING FOR SPARSE IMAGE REPRESENTATION AND CLASSIFICATION AND LOW DATA RATE COMPRESSION

(75) Inventors: Shubha L. Kadambe, Cedar Rapids, IA (US); Lawrence Carin, Durham, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 752 days.

(21) Appl. No.: 12/586,934

(22) Filed: Sep. 30, 2009

(51) Int. Cl.
*G06K 9/36* (2006.01)
*H04N 11/02* (2006.01)
(52) U.S. Cl. ............... 382/239; 382/232; 348/404.1; 375/240.08; 375/240.18
(58) Field of Classification Search .................. None
See application file for complete search history.

(56) References Cited

U.S. PATENT DOCUMENTS 6,424,960 B1 * 7/2002 Lee et al. .................. 706/20
6,870,962 B2 * 3/2005 Lee et al. .................. 382/248

OTHER PUBLICATIONS

Kitaura et al. (2004) "Radial basis function network with bias compensation for regularly sampled inputs." Signal Processing, vol. 84 pp. 141-150.*
Rubinstein et al. (2008) "Efficient implementation of the K-SVD algorithm using batch orthogonal matching pursuit." Technion Computer Science Department Technical Report CS-2008-08.*
Zatschler, H. (2003) "M4R Project." http://www.doc.ic.ac.uk/~hz3/m4rproject/node5.html as retrieved from the Internet Archive, http://www.archive.org/. Version as of Jun. 22, 2003.*
Aharon et al., K-SVD: An Algorithm for Designing Overcomplete Dictionaries for Sparse Representation, IEEE Trans. Signal Processing, vol. 54, No. 11, 2006, 29 pages.
Baranluk, Compressive Sensing, IEEE Signal Processing Magazine, Jul. 2007, 4 pages.
Beal, Variational Algorithms for Approximate Bayesian Inference, PhD thesis, Gatsby Computational Neuroscience Unit, University College London, May 2003, 281 pages.
Candes et al., Near-Optimal Signal Recovery from Random Projections: Universal Encoding Strategies?, IEEE Trans. Information Theory, Oct. 2004; Revised Mar. 2006, 39 pages.
Cristianini et al., An Introduction to Support Vector Machines and Other Kernel-Based Learning Methods, Cambridge University Press, 2000.
Duarte-Carvajalino et al., Learning to Sense Sparse Signals: Simultaneous Sensing Matrix and Sparsifying Dictionary Optimization, IMA Preprint Series 2211, May 2008, 31 pages.
Elad et al., Image Denoising via Sparse and Redundant Representations over Learned Dictionaries, IEEE Transactions on Image Processing, vol. 15, No. 12, Dec. 2006, 10 pages.
Ferguson, A Bayesian Analysis of some Nonparametric Problems, Annals of Statistics, Vo. 1, No. 2, 1973, 22 pages.
Girolami et al., Variational Bayesian Multinomial Probit Regression with Gaussian Process Priors, Neural Computation, Presenter: Minhua Chen, Aug. 22, 2008, 17 pages.
Ji et al., Bayesian Compressive Sensing, IEEE Trans. Signal Processing, Jun. 2008, 23 pages.
Knowles et al., Infinite Sparse Factor Analysis and Infinite Independent Components Analysis, Proc. International Conference on Independent Component Analysis and Signal Separation, Sep. 9-12, 2007, 8 pages.

(Continued)

*Primary Examiner* — Barry Drennan
(74) *Attorney, Agent, or Firm* — Donna P. Suchy; Daniel M. Barbieri

(57) ABSTRACT

A computerized method for transforming a signal representative of image information, the signal being a sparse signal, includes obtaining the signal. The method further includes using the signal to learn a dictionary of basis functions that represent at least part of the signal. The method further includes using the learned dictionary of basis functions to transform the signal.

21 Claims, 5 Drawing Sheets

OTHER PUBLICATIONS

Mairal et al., Sparse Representation for Color Image Restoration, IEEE Transactions on Image Processing, Jan. 2008, 17 pages.

Marial et al., Online Dictionary Learning for Sparse Coding, Proc. International Conference on Machine Learning, Montreal, Canada, Jun. 14-18, 2009, 34 pages.

Marial et al., Supervised Dictionary Learning, Proc. Neural Information Processing Systems, Dec. 8-13, 2008, 1 page.

Olshausen et al., Sparse Coding with an Overcomplete Basis Set: A Strategy Employed by VI?, Vision Research, Jan. 8, 1998, 32 pages.

Paisley et al., Nonparametric Factor Analysis with Beta Process Priors, Proceedings of the $26^{th}$ International Conference on Machine Learning, Montreal, Canada, Jun. 14-18, 2009, 8 pages.

Rai et al., Nonparametric Bayesian Sparse Hierarchical Factor Modeling and Regression, Proc. Neural Information Processing Systems, Dec. 8-13, 2008, 2 pages.

Raina et al., Self-Taught Learning: Transfer Learning from Unlabeled Data, Proceedings of the $24^{th}$ International Conference on Machine Learning, Corvallis, Oregon, 2007, 8 pages.

Ranzato et al., Efficient Learning of Sparse Representations with an Energy-Based Model, Proc. Neural Information Processing Systems, Vancouver, Canada, Dec. 4-7, 2006, 8 pages.

Rodriguez et al., Nonparametric Bayesian Models through Probit Stickbreaking Processes, University of California Santa Cruz Technical Report, 2009, 29 pages.

Sethuraman, A Constructive Definition of Dirichlet Priors, Statistica Sincia, May 1991, 14 pages.

Thibaux et al., Hierarchical Beta Processes and the Indian Buffet Process, Proc. International Conference on Artificial Intelligence and Statistics, Nov. 5, 2006, 15 pages.

Tibshirani, Regression Shrinkage and Selection via the Lasso, Journal of the Royal Statistical Society, Series B 1996, 58, No. 1, 22 pages.

Tipping, Sparse Bayesian Learning and the Relevance Vector Machine, Journal of Machine Learning Research, Jun. 2001, 35 pages.

Wright et al., Robust Face Recognition via Sparse Representation, IEEE Trans. Pattern Analysis Machine Intelligence, Feb. 2009, 30 pages.

* cited by examiner

US 8,396,310 B1

BASIS LEARNING FOR SPARSE IMAGE REPRESENTATION AND CLASSIFICATION AND LOW DATA RATE COMPRESSION

BACKGROUND

The present disclosure generally relates to the field of signal analysis in an aircraft. Further, the present disclosure relates to the field of using basis functions for signal analysis in an aircraft. Basis functions may be generally used to analyze signals (e.g., images) obtained by an aircraft and/or ground station. Some systems use a dictionary of basis functions for signal analysis. In such systems, the dictionary is typically fixed, i.e., the basis functions in the dictionary are pre-set and are not based on any signal analysis of the current signal.

SUMMARY

One embodiment relates to a computerized method for transforming a signal representative of image information, the signal being a sparse signal, and includes obtaining the signal. The method further includes using the signal to learn a dictionary of basis functions that represent at least part of the signal. The method further includes using the learned dictionary of basis functions to transform the signal.

Another embodiment relates to a computerized system for transforming a signal representative of image information, the signal being a sparse signal and obtained from at least one of a receiver, a memory, and a camera. The system comprises a dictionary learning module configured to learn a dictionary of basis functions that represent at least part of the signal based on the signal. The system further comprises a signal analysis module configured to use the learned dictionary of basis functions to transform the signal.

Yet another embodiment relates to a computerized method of transforming a signal representative of image information, the signal being a sparse signal. The method includes obtaining the signal. The method further includes analyzing the signal to determine parameters for learning a dictionary of basis functions for the signal. The basis functions represent at least part of the signal. The parameters include at least one of a number of basis functions in the dictionary of basis functions and a sparsity level of the signal. The method further includes learning the dictionary of basis functions based on the determined parameters, wherein the dictionary is learned using a Beta process. The method further includes estimating a representation of the signal based on the learned dictionary of basis functions. The method further includes calculating an error between the signal and the representation of the signal. The method further includes adjusting the parameters based on the calculated error. The method further includes re-estimating the representation based on the adjusted parameters. The method further includes repeating the calculating, adjusting and re-estimating until the error is below an error threshold. The method further includes learning the dictionary of basis functions based on the determined parameters. The dictionary is learned using a Beta process. The method further includes transforming the signal based on the learned dictionary of basis functions. Transforming the signal includes performing at least one of denoising, inpainting, and compressive sensing on the signal.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the figures, methods of analyzing and transforming signals (e.g., sparse signals, non-sparse signals) are described. A basis function may be used to represent at least part of a signal (e.g., representing an image) obtained by an aircraft. A set of basis functions may be used to represent the whole signal. Different subsets of basis functions may be used to represent or capture different features of the signal. In some systems, off-the-shelf or pre-existing (e.g., fixed) sets of basis functions (e.g., wavelets, discrete cosine transforms (DCT), etc.) may be used to represent the signal and may not be based on or matched to the signal.

The exemplary embodiments disclosed herein provide methods for learning a set of basis functions (e.g., called a dictionary) using the signal after it has been received. The learned dictionary may be used to perform a desired analysis on the signal, including, for example, compression, decompression, noise reduction, and inserting missing pixels. By using the signal to learn the dictionary after the signal has been received and before the desired analysis is performed (rather than using a pre-set dictionary), the analysis may be done more efficiently and/or effectively (e.g., using less memory and/or bandwidth, and/or resulting in a more accurate analysis).

Figure 1:
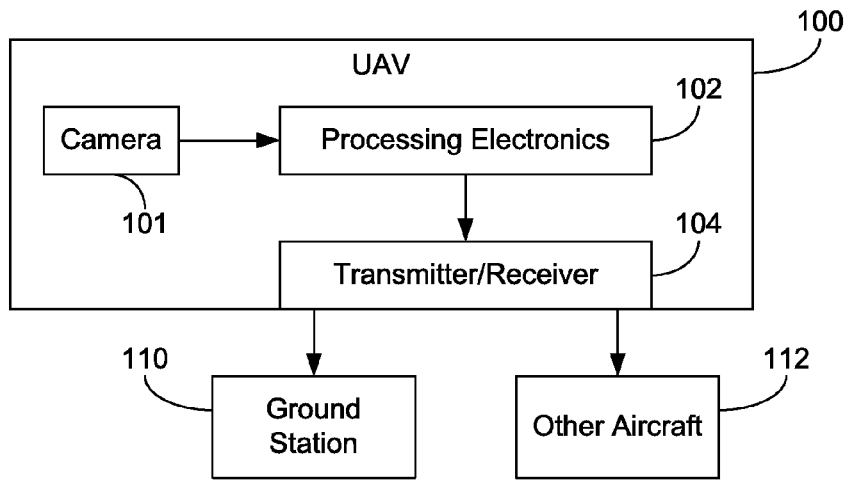
FIG. 1 is a block diagram of an unmanned air vehicle, according to an exemplary embodiment.

Referring to FIG. 1, a block diagram of a UAV 100 for use with the systems and methods of the present application is shown, according to an exemplary embodiment. According to various exemplary embodiments, other aircraft may be used with the systems and methods of the present application instead of a UAV. UAV 100 may include processing electronics 102 for analyzing a received signal (from a camera 101 of UAV 100, from a radar system of UAV 100, from memory of UAV 100, or otherwise) and a transmitter/receiver 104 for receiving and sending the signals. UAV 100 may analyze a received signal and provide data regarding the analyzed signal to a ground station 110, another aircraft 112, or otherwise via transmitter/receiver 104. According to various exemplary embodiments, processing electronics 102 for analyzing a signal received by UAV 100 may be located in ground station 110 or another aircraft 112. Camera 101 may be configured to provide processing electronics with images or videos for signal analysis.

Figure 2A:
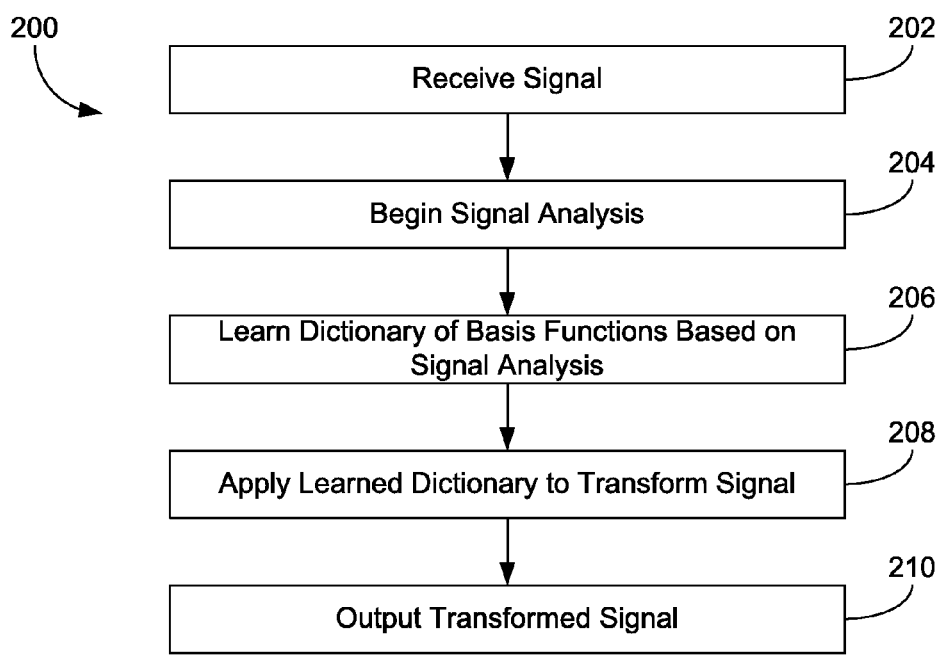
FIG. 2A is a flow chart of a process for learning and using basis functions to analyze signals, according to an exemplary embodiment.

Referring to FIG. 2A, a flow chart of a process 200 for learning and using a dictionary to analyze a signal is shown, according to an exemplary embodiment. The dictionary may contain basis functions that may be used by the processing electronics (e.g., processing electronics 102 of FIG. 1) of the aircraft to analyze a signal. In some embodiments, process 200 may be performed on-line (e.g., in an aircraft and/or ground station as it is operating/or communicating). All or part of process 200 may be performed in real-time or near real-time as a signal is obtained or upon a delay (e.g., fixed, user-defined, signal-based, etc.). In other embodiments, at least part of process 200 may be performed off-line (e.g., when an aircraft and/or ground station is not operating and/or communicating).

Process 200 includes receiving a signal at the processing electronics of the aircraft (step 202). The signal can be received from a camera, a radar system, a memory, a receiver, or another aircraft system configured to provide a signal regarding an image, video, or other data capture.

The signals received by the aircraft may be, for example, signals regarding images recorded by a radar system of the aircraft or otherwise. The images may be estimated as a weighted linear combination of basis functions (e.g., an image X may be represented as $\hat{X}=A\alpha$, where $\hat{X}$ is an approximation of the image as a result of the weighted linear combination, A is a dictionary (e.g., matrix) of the basis functions, and a is a weight vector that is sparse).

When an image is estimated using the basis functions, an error $\epsilon$ representing the difference between the image X and its approximated image $\hat{X}$ may be calculated. The error $\epsilon$ may be reduced as the dictionary A of basis functions is adjusted and optimized. The dictionary A for which the error $\epsilon$ is minimized may be used to provide basis functions for further analysis of the image X.

The processing electronics may begin to analyze the signal (step 204). The signal analysis may include compressive sensing (compressing and/or decompressing the signal), inpainting, denoising, or otherwise. The signal analysis may be used to learn (e.g., form) a dictionary of basis functions (step 206). The basis functions may be learned using a non-parametric method of analysis such as a variational Bayesian analysis using a Beta process prior, a Gibbs-sampling analysis, or another type of analysis. Using a Beta process allows for a desired set of features for data to be inferred rather than set prior to the onset of the process. Step 206 is described in greater detail in FIG. 3A.

In step 206, the dictionary of basis functions may be learned based on properties of the signal and/or a transformation to be applied to the signal using the dictionary. The basis functions may be learned based on signal or image properties, structure, content, etc. as determined during signal analysis. The dictionary may be determined by including basis functions that most closely relate to a portion of an image or signal, or by another inferring method. The dictionary may be determined by including basis functions relating to portions of an image or signal that are important for analyzing and/or transforming the image or signal. In some embodiments, the subset may be determined based at least in part on the application or transformation that is being performed on the signal (e.g., denoising, inpainting, compressive sensing, etc.). For example, in one embodiment, the dictionary may be learned such that it includes basis functions important for inserting missing pixels in an image. In another embodiment, the dictionary may be learned such that it includes basis functions important for removing noise from the image. The learned dictionary of basis functions may then be used to transform the signal (e.g., by denoising, inpainting, compressive sensing, etc.) (step 208), and the transformed may be output to the UAV, another aircraft, a ground station, or otherwise (step 210). In some embodiments, a subset of the learned dictionary of basis functions may be used to transform the signal in step 208.

Figures 2B, 3A, 3B:
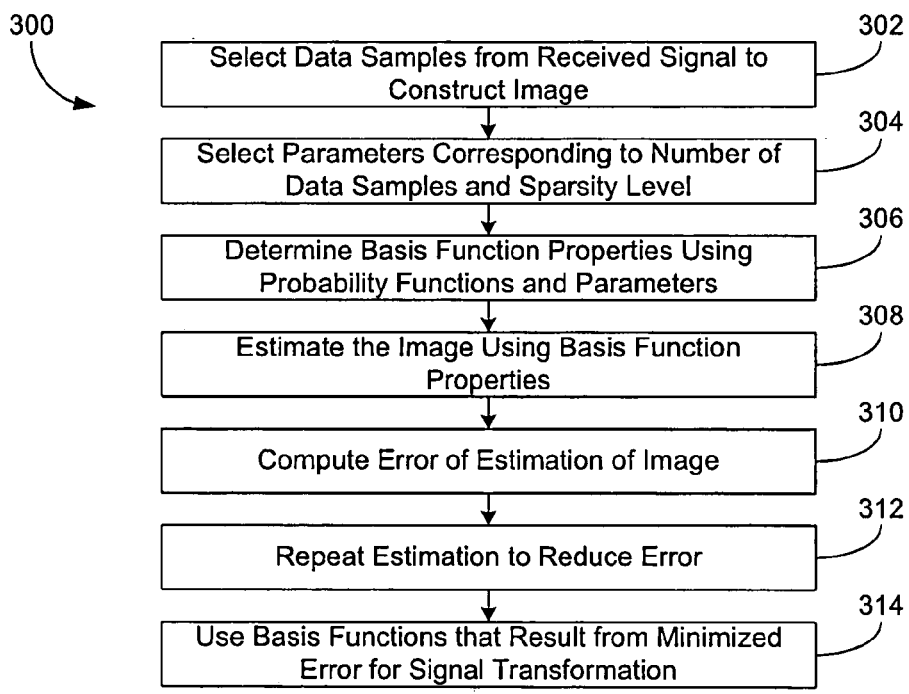
FIG. 2B is a diagram of a dictionary including a matrix of basis functions, according to an exemplary embodiment.
FIG. 3A is a flow chart of a basis function learning process, according to an exemplary embodiment.
FIG. 3B is a diagram of selecting a subset of features from a data sample, according to an exemplary embodiment.

FIG. 2B illustrates an exemplary dictionary 250 of basis functions that may be learned in step 206. Basis function elements may be stored in a matrix format as shown. One or more of basis functions $A_1, A_2, A_3$ may be learned or chosen based on how important the basis function is to the signal being analyzed, the relevance of the basis function to the transformation to be applied to the signal, etc. Dictionary 250 may include any number of basis functions with any number or type of basis function elements.

Referring to FIG. 3A, a flow chart of a basis function learning process 300 is shown, according to an exemplary embodiment. Basis function learning process 300 may be used to learn a dictionary of basis functions based on the obtained or received signal. Using process 300, a dictionary of basis functions may be determined (e.g., step 206 of process 200) to be used for further signal analysis.

Process 300 may include selecting N data samples (e.g., $x_1, x_2, \ldots, x_n$) from the received signal (e.g., images, portions of images received, etc.) to construct an image (step 302). The signal may include data for one or more images and several portions (e.g., patches) of the images may be selected. As one example, a signal may include data for 25 images of size 128 pixels by 128 pixels, and 1,280 patches may be sampled from the images. According to various exemplary embodiments, the signal may include data for any number of images and any number of patches from the images may be selected. The number of patches selected may be random or fixed. Step 302 may additionally include selecting data samples from one or more training images (e.g., pre-existing images used to construct a representation of the image and reduce the error in the representation). Training images may be used, for example, rather than or in addition to the signal for selecting data samples to learn the dictionary of basis functions (e.g., for off-line dictionary learning). In some embodiments, all data from the training images may be processed together by process 300. In other embodiments (e.g., if the training images are large such that the number of data samples N is large) the data from the training images may be partitioned into two or more subsets of data and the subsets may be processed independently (e.g., sequentially) by process 300.

Parameters may be selected for learning the dictionary of basis functions. The parameters may include the number of data samples and/or basis functions and the sparsity level of the signal (step 304). One or more parameters may be selected for determining how many basis functions to generate. Another parameter may be selected to specify the sparsity level of a representation under the learned dictionary. For example, two parameters $A_0, B_0$ may be constants chosen to control how many basis functions process 300 may attempt to find. Another parameter K may be a constant chosen to control the sparsity level (e.g., how sparse or dense the number of data samples chosen are compared to the total number of possible data samples) of the basis functions. By tuning the values (e.g., changing the values) of $A_0, B_0$, and K, properties of the dictionary of basis functions (e.g., the sparseness of the dictionary of basis functions) may be adjusted. In one example a dictionary may have a large reconstruction error and very sparse representation (e.g., basis functions that result in an increased error $\epsilon$ and less basis functions in the dictionary). In another example a dictionary may have a small reconstruction error and a less sparse representation (e.g., basis functions that result in a minimized error $\epsilon$ and more basis functions in the dictionary).

The selection of parameters in step 304 may be done via the processing electronics of the UAV or other aircraft, by a user of the UAV or other aircraft, or otherwise. According to an exemplary embodiment, the selection of the parameters may be based on analysis already performed on the signal. The selection of the parameters may be further based on the training images selected as data samples in step 302 in order to reduce an error in a representation of the signal based on the learned dictionary. In some embodiments, the parameters may be values stored in a memory and may be fixed, random, etc.

FIG. 3B illustrates an exemplary table of data samples and weights that may be selected in steps 302 and/or 304 for use by process 300. Data samples $x_1, x_2, \ldots, x_n$ may be chosen in step 302. For each data sample, a subset of features from the data samples may be selected. For example, each data sample may have features $\theta_1, \theta_2, \ldots \theta_k$ where k is the number of features. For each data sample selected in step 302, one or more features of the data samples (e.g., specific properties of the data samples such as image properties, objects detected or identified in the images, portions of images, etc.) may be chosen. More than one feature may be chosen from a data sample, and a specific feature for multiple data samples may be chosen. For example, one feature may relate to a specific portion of an image in the data samples, and the specific portion of the image may be chosen from multiple data samples. According to various exemplary embodiments, the selection of the data samples and features of the data samples may be performed by process 300, specified by a user, or otherwise.

Referring again to FIG. 3A, using the properties selected in step 304, factors for determining basis function properties may be computed (step 306). Basis function properties may include, for example, a weighting factor used to determine the weight of specific basis functions of the dictionary (e.g., how important or relevant each basis function is). Basis function properties may further include how often an image or patches of an image are sampled. For example, a specific image or portion of an image may be sampled more than once, and basis function properties may be computed to determine how often the image is to be sampled. The computation of basis function properties is shown in greater detail in process 400 of FIG. 4.

Using the basis function properties determined in step 306, a joint probability may be calculated using the properties, resulting in an estimated image $\hat{X}$ (step 308). The joint probability of the basis function properties estimates the properties of an image, and the properties are used to form the estimated image $\hat{X}$. The calculation is shown in greater detail in process 400 of FIG. 4.

The estimated image calculated in step 308 may be compared to the actual received image or signal and the error $\epsilon$ between the two images may be calculated (step 310). Using the error $\epsilon$, parameters (e.g., the parameters selected in step 304) may be adjusted and another estimation of the image $\hat{X}$ may be calculated (e.g., re-learned) using the joint probability function and adjusted parameters (step 312). Steps 310-312 may be repeated such that the error $\epsilon$ is minimized (or until the error $\epsilon$ is below an error threshold specified by the user, aircraft processing electronics, or otherwise, when the error $\epsilon$ reaches a confidence level, etc.). When the error $\epsilon$ reaches or goes below the error threshold, the basis functions of the dictionary may be used to transform the signal (step 314).

The number of basis functions to be created via process 300 may not be fixed, according to an exemplary embodiment. Process 300 may be configured to infer an appropriate number of basis functions to include in the dictionary. For example, the number of data samples chosen or the number or value of the parameters chosen may be variable such that an appropriate number of basis functions in the dictionary is inferred instead of fixed.

Figure 4:
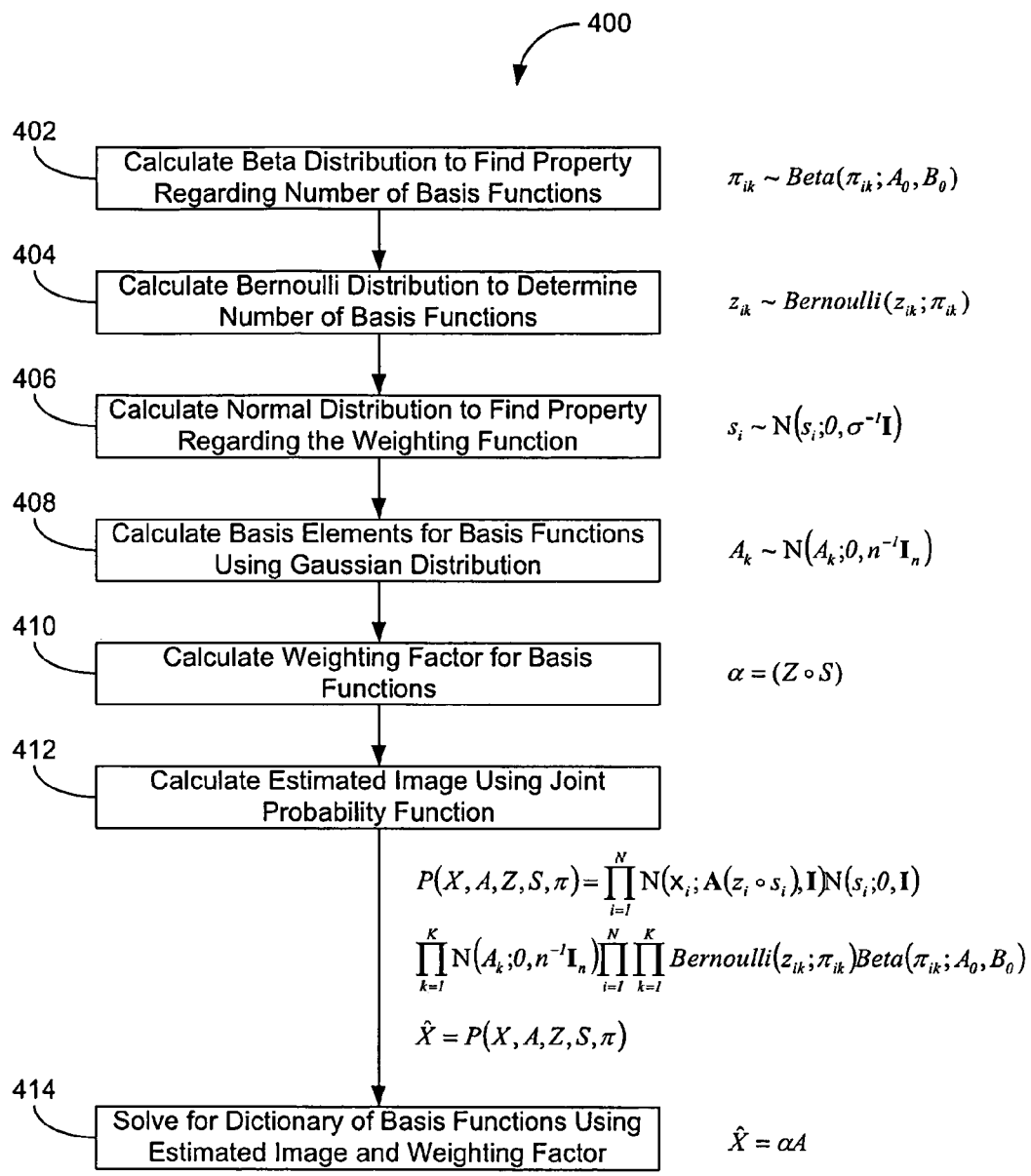
FIG. 4 is a flow chart of a process for calculating a joint probability distribution for determining a basis function, according to an exemplary embodiment.

Referring now to FIG. 4, a flow chart of a process 400 (e.g., a Beta process) for the calculations of steps 306-308 of process 300 is shown in greater detail, according to an exemplary embodiment. Process 400 includes various distribution and probability functions for determining properties of an approximate image, and the joint probability of all the functions may be calculated to obtain the approximate image.

Process 400 includes calculating a Beta distribution of the two parameters $A_0$, $B_0$ (step 402) to determine a property $\pi_{ik}$. The property $\pi_{ik}$ may be used to represent how many basis functions process 400 should create. $\pi_{ik}$ may be represented as:

$$\pi_{ik} \sim \text{Beta}(\pi_{ik}; A_0, B_0).$$

Parameters $A_0$, $B_0$ may be user selected, selected by an automated process, fixed, obtained from memory, etc. For example, if a user wishes to increase the number of basis functions to find, the user may set $A_0$ to be a larger value.

Process 400 further includes using the property $\pi_{ik}$ determined in step 402 to calculate a Bernoulli distribution to determine a property $z_{ik}$ (step 404). The property $z_{ik}$ may be used to represent how many basis functions process 400 should calculate. $z_{ik}$ may be represented as:

$$z_{ik} \sim \text{Bernoulli}(z_{ik}; \pi_{ik}).$$

Process 400 further includes calculating a normal distribution to determine a property $s_i$ (step 406) for calculating a weighting function. The property $s_i$ may be used to represent a weighting function associated with the basis functions. $s_i$ may be represented as:

$$s_i \sim N(s_i; 0, \sigma^{-1} I)$$

where $\sigma^{-1}$ represents a weighting factor constant to be used and I is the identity matrix. Using the values for $s_i$, a weighting factor for determining the weight (e.g., importance) of each basis function may be calculated.

Process 400 further includes calculating basis elements $A_k$ via a multivariable Gaussian distribution (step 408). $A_k$ may be represented as:

$$A_k \sim N(A_k; 0, n^{-1} I_n)$$

where $n^{-1}$ is used to determine a matrix of basis elements and $I_n$ is the identity matrix with n rows and columns. Using the values for $A_k$, a matrix of basis function elements may be populated.

Using the properties and basis elements calculated in steps 402-408, a weighting factor may be calculated (step 410). The weighting factor $\alpha$ may be represented as:

$$\alpha = (Z \cdot S).$$

such that the weighting factor is an element-wise or Hadamard multiplication of Z and S.

Z may be a matrix represented as:

$$Z \in \{0,1\}^{K \times N}$$

where K represents the sparsity level (chosen in step 304 of process 300) and N represents the number of patches selected from the signal (chosen in step 302 of process 300). The $i^{th}$ column of Z corresponds to the value of $z_{ik}$ calculated in step 404, and the $k^{th}$ row of Z corresponds to the basis elements $A_k$ calculated in step 408. S is a vector containing the values of $s_i$ calculated in step 406.

An estimated image $\hat{X}$ may then be calculated using the values in steps 402-408 (step 412). The image $\hat{X}$ may be estimated by using a joint probability function:

$$P(X, A, Z, S, \pi) = \prod_{i=1}^{N} N(X_i; A(z_i \circ s_i), I) N(s_i; 0, I)$$

$$\prod_{k=1}^{K} N(A_k; 0, n^{-1} I_n) \prod_{i=1}^{N} \prod_{k=1}^{K} \text{Bernoulli}(z_{ik}; \pi_{ik}) \text{Beta}(\pi_{ik}; a_0, b_0)$$

where $\hat{X} = P(X, A, Z, S, \pi)$.

Therefore, using the following equation, basis functions A of a dictionary may be found (step 414):

$$\hat{X} = \alpha A.$$

Referring also to process 300 of FIG. 3A, all or part of process 400 may be repeated in order to reduce an error between the estimated image calculated in step 412 and the actual image.

In some embodiments, process 400 may be adjusted to account for the structure and/or properties of the signal or image. For example, the Beta process may be modified using a Dirichlet process or a probit stick-breaking process to reflect the special structure of the image.

Figure 5:
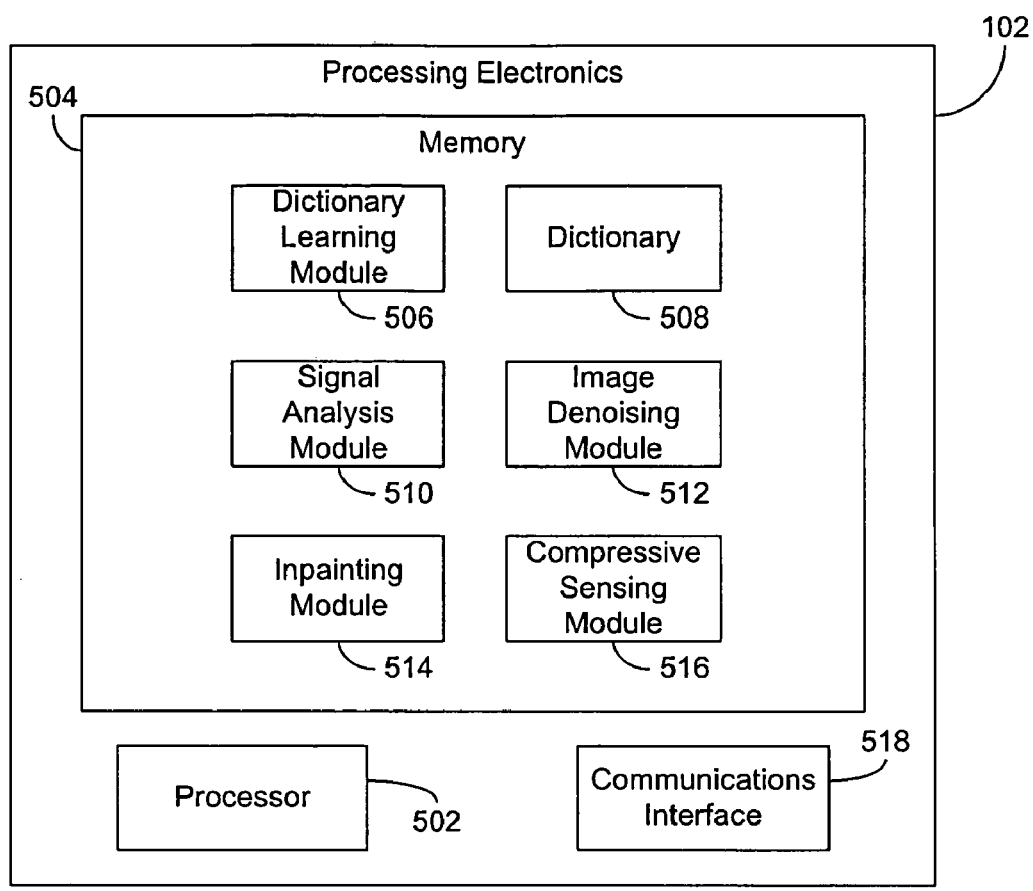
FIG. 5 is a block diagram of processing electronics configured to execute the systems and methods of the present application, according to an exemplary embodiment.

Referring to FIG. 5, a block diagram of a processing electronics 102 for use with the systems and methods of the present application is shown in greater detail, according to an exemplary embodiment. Processing electronics 102 is shown to include a processor 502 and memory 504. Processor 502 may be a general purpose or specific purpose processor configured to execute computer code or instructions stored in memory 504 or received from other computer readable media (e.g., CDROM, network storage, a remote server, etc.) Memory 504 may be RAM, hard drive storage, temporary storage, non-volatile memory, flash memory, optical memory, or any other suitable memory for storing software objects and/or computer instructions. When processor 502 executes instructions stored in memory 504 for completing the various activities described herein, processor 502 generally configured processing electronics 102 to complete such activities. Processing electronics 102 is further shown to include communications interface 518 configured to transmit and receive signals to and from one or more other aircraft, a ground station, a radar, etc.

Memory 504 is shown to include various modules which are computer code modules (e.g., executable code, object code, source code, script code, machine code, etc.) configured for executing by processor 502. Memory 504 includes dictionary 508 containing the learned basis functions used for signal analysis. Memory 504 further includes a dictionary learning module 506 configured to build dictionary 508 with learned basis functions (e.g., learning basis functions and building a matrix of the basis functions to form the dictionary as described in processes 300, 400 of FIGS. 3-4). Dictionary 508 may be stored in memory 504 as a table, an array, a linked list or other list, a hash table or other table, trees, or any other type of data structure.

Memory 504 further includes a signal analysis module 510 configured to receive a signal and to analyze the signal using dictionary 508. Signal analysis module 510 may receive a signal from communications interface 518 and perform an initial signal analysis. Data from the signal analysis may be provided to dictionary learning module 506 for creating dictionary 508. Data may include parameters for learning dictionary 508 or data that dictionary learning module 506 may use to determine the parameters. Signal analysis module 510 may then use dictionary 508 to further analyze the signal and estimate a representation of the signal based on the analysis. Signal analysis module 510 may further be configured to calculate an error between the signal and the estimated representation of the signal, and may either adjust parameters and provide the parameters to dictionary learning module 506 or provide data for dictionary learning module 506 for adjusting the parameters. Signal analysis module 510 may provide the signal to other modules such as image denoising module 512, inpainting module 514 and/or compressive sensing module 516 to perform further analysis and/or transform the signal.

Memory 504 is further shown to include image denoising module 512, inpainting module 514, and compressive sensing module 516. Basis functions of dictionary 508 may be used for various types of signal analysis. For example, image denoising module 512 may be configured to remove or reduce noise in the signal based on dictionary 508. Denoising may be accomplished without prior knowledge of the noise variance of the signal as the noise variance may be inferred in the process of learning dictionary 508. In some embodiments, the noise variance may be non-stationary and/or non-uniform. In some embodiments, denoising may be accomplished substantially simultaneously with learning dictionary 508 (e.g., if there is additive noise but not missing pixels). Inpainting module 514 may be configured to reconstruct an image based on dictionary 508. The reconstruction of the image may include, for example, inserting missing pixels of the image. Dictionary 508 may be used to reduce an error in the estimated signal due to missing pixels or data, noise, or otherwise. For example, the selection of basis functions of dictionary 508 may be based on a determination of the portion of the signal (e.g., the image) that has an error. Basis functions regarding a part of the signal that has missing pixels or is distorted by noise may be chosen as part of the subset of basis functions chosen from dictionary 508 such that those basis functions may be used to reconstruct the signal. Image denoising module 512, inpainting module 514, compressive sensing module 516, and/or other modules of memory 504 may analyze and/or process the signal or image as a whole or may partition the signal or image into two or more parts or blocks.

Compressive sensing module 516 is configured to perform compressive sensing on a signal using dictionary 508. Compressing sensing may be used to compress and/or decompress the signal. In some embodiments, compressive sensing module 516 may be configured to transform the signal to create a compressed representation of the original signal. The transformed signal may then be provided to communications interface 518 for transmitting the signal to a ground station, another aircraft, or otherwise. Compressive sensing module 516 may be used to reduce the bandwidth required to transmit the signal to a ground station, aircraft, or otherwise (e.g., the uncompressed signal may require at least five times the bandwidth for transmission than the compressed signal compressed by module 516). Compressive sensing module 516 may additionally be configured to compress a received signal before the signal is used to learn the dictionary of basis functions. In some embodiments, compressive sensing module 516 may be used to jointly perform compression and classification on the signal.

In some embodiments, compressive sensing module 516 may be configured to decompress or reconstruct a compressed signal received from a ground station or other aircraft into an uncompressed signal based on dictionary 508. For example, processing electronics 102 may receive a compressed signal transmitted from a ground station or other aircraft, and compressive sensing module 516 may receive the signal. Using dictionary 508, compressive sensing module 516 may be used to decompress the signal for further analysis, transformation and/or transmission. In some embodiments, compressive sensing may be performed jointly or substantially simultaneously with learning dictionary 508.

Processing electronics 102 may be located in the aircraft receiving the signals for analysis, according to an exemplary embodiment. According to other exemplary embodiments, processing electronics 102 may be located in another aircraft or ground station. For example, processing electronics 102 may be in a ground station, and the ground station may be configured to receive signals from a UAV or otherwise for analysis. The ground station may then use compressive sensing module 516 to uncompress a received signal from the UAV and perform signal analysis on the received signal.

Figure 6:
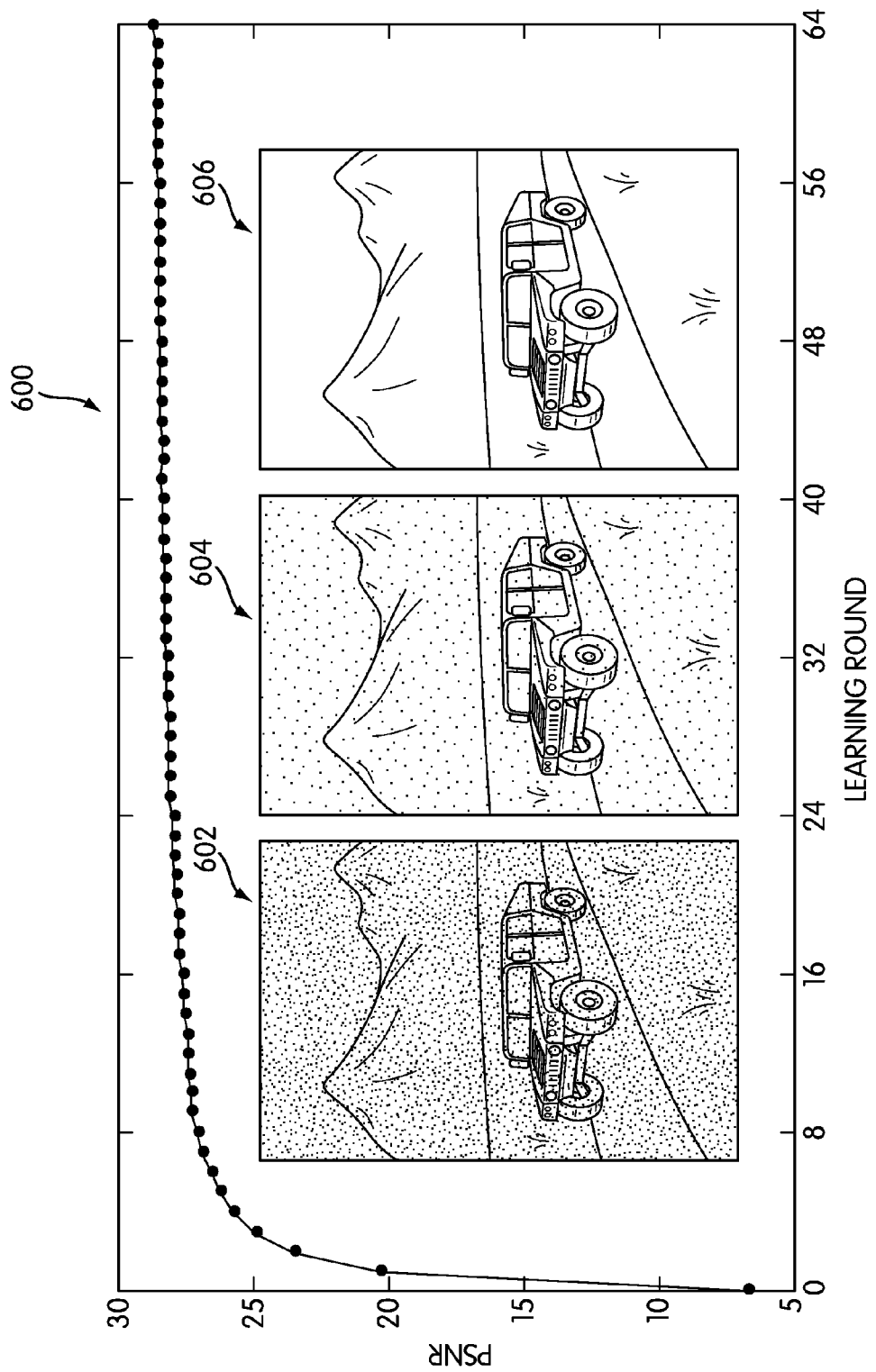
FIG. 6 is a graph and corresponding images illustrating an inpainting process performed using the systems and methods of the present application, according to an exemplary embodiment.

Referring now to FIG. 6, an exemplary graph 600 and corresponding images illustrating an inpainting process performed using the systems and methods disclosed herein is shown. Graph 600 includes a horizontal or X axis representing the number of dictionary learning rounds performed before inpainting. Graph 600 also includes a vertical or Y axis representing a peak signal to noise ratio or peak signal to reconstructed image ratio (PSNR). The PSNR represents the quality of the reconstructed image, or how many missing pixels have been inserted into the image. In the curve shown in graph 600, the PSNR or quality of the image increases as the number of dictionary learning rounds increase. Images 602, 604 and 606 represent the same inpainted image after a progressively increasing number of dictionary learning rounds. Image 602 is inpainted using a dictionary learned over the least number of rounds and is missing the most pixels of the three images. Image 604 is inpainted using a dictionary learned over more rounds than the dictionary used to inpaint image 602 but less rounds than that used to inpaint image 606. Image 604 is missing less pixels than image 602 after inpainting but more pixels than image 606. Image 606 is inpainted using a dictionary learned over the most rounds of the three images and is missing the least pixels after inpainting. As more rounds of dictionary learning are completed, the basis functions of the dictionary increasingly allow a more complete inpainting procedure to be performed based on the dictionary.

Signals, images and basis functions are referenced throughout the present disclosure in connection with various activities performed on or by the systems and methods disclosed herein. Signals may be representative of any type of data or information, including image, video, audio, and other information. Substitutions, modifications, changes, and omissions may be made to one or more elements of the systems and methods disclosed herein based on the type of data or information without departing from the scope of the present disclosure. An image is one type of information a signal may represent. Where the present disclosure refers to activities performed on or with an image it should be appreciated that the activities may also be performed on or with a signal representing a different type of information. Further, signals may be representative of data having one or more dimensions (e.g., 1D, 2D, 3D). A basis function is any element or function that may be used to describe at least part of a signal. A basis function may also be an element of the basis for a function space such that every function in the function space can be represented as a linear combination of basis functions.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine over a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for transforming a signal representative of image information, the signal being a sparse signal, the method comprising:
   obtaining the signal;
   using the signal to learn a dictionary of basis functions that represent at least part of the signal based on the signal, wherein learning the dictionary of basis functions includes estimating a representation of the signal and using parameters determined from the signal, wherein the dictionary is learned using a Beta process, wherein the basis functions represent at least part of the signal, wherein the parameters include at least one of a number of basis functions in the dictionary of basis functions; and
   using the learned dictionary of basis functions to transform the signal, wherein the transformed signal based on the learned dictionary of basis functions, wherein transforming the signal includes performing at least one of denoising, inpainting, and compressive sensing on the signal.

2. The method of claim 1, further comprising selecting the number of data samples and a sparsity level, wherein properties of the basis function are determined using the number of data samples and the sparsity level.

3. The method of claim 2, further comprising:
   calculating an error between the signal and the representation of the signal;
   adjusting the parameters for learning the dictionary of basis functions based on the calculated error;
   re-estimating the representation of the signal based on the adjusted parameters; and
   repeating the calculating, adjusting and re-estimating until the error is below an error threshold.

4. The method of claim 2, wherein the parameters include at least one of a number of basis functions in the dictionary of basis functions and a sparsity level of the representation.

5. The method of claim 1, wherein the signal is transformed based on a weight vector, wherein the weight vector represents weights associated with the basis functions of the learned dictionary, wherein the weight vector is sparse.

6. The method of claim 1, wherein transforming the signal includes performing compressive sensing on the signal to compress the signal based on the learned dictionary of basis functions, wherein the transformed signal is a compressed representation of the signal.

7. The method of claim 1, wherein transforming the signal includes reducing noise in the image based on the learned dictionary of basis functions.

8. The method of claim 1, wherein transforming the signal includes inserting missing pixels in the image based on the learned dictionary of basis functions.

9. The method of claim 1, wherein the signal is a compressed signal, wherein transforming the signal includes performing compressive sensing on the signal to reconstruct an uncompressed signal based on the learned dictionary of basis functions.

10. The method of claim 1, further comprising: prior to using the signal to learn the dictionary, analyzing the signal to determine parameters for learning a dictionary of basis functions.

11. The method of claim 1, further comprising: analyzing at least one training image to determine an initial representation of the signal.

12. The method of claim 1, wherein the steps are performed by at least one of a ground station and an aircraft.

13. A computerized system for transforming a signal representative of image information, the signal being a sparse signal, the signal being obtained from at least one of a receiver, a memory and a camera, the system comprising:
   a dictionary learning module configured to learn a dictionary of basis functions that represent at least part of the signal based on the signal; and
   a signal analysis module configured to use the learned dictionary of basis functions to transform the signal, wherein the signal is analyzed to determine parameters for learning the dictionary of basis functions for the signal, wherein the basis functions represent at least part of the signal, wherein the parameters include at least one of a number of basis functions in the dictionary of basis functions and a sparsity level of the signal, wherein the dictionary is learned using a Beta process; and
   wherein the signal is transformed based on the learned dictionary of basis functions, wherein the signal is at least one of denoised, inpainted, and compressive sensed.

14. The system of claim 13, wherein the dictionary learning module is configured to estimate a representation of the signal.

15. The system of claim 14, wherein the dictionary learning module is configured to calculate an error between the signal and the representation of the signal and adjust the parameters for learning the dictionary of basis functions based on the error, wherein the dictionary learning module is configured to re-estimate the representation of the signal based on the adjusted parameters, and wherein the dictionary learning module is configured to repeat the calculating, adjusting and re-estimating until the error is below an error threshold.

16. The system of claim 13, further comprising a compressive sensing module configured to compress the signal based on the learned dictionary of basis functions.

17. The system of claim 13, further comprising an image denoising module configured to reduce noise in the signal based on the learned dictionary of basis functions.

18. The system of claim 13, further comprising an inpainting module, wherein the signal represents an image and the inpainting module is configured to insert missing pixels in the image based on the learned dictionary of basis functions.

19. The system of claim 13, further comprising a compressive sensing module, wherein the signal is a compressed signal and the compressive sensing module is configured to reconstruct an uncompressed signal based on the learned dictionary of basis functions.

20. The system of claim 13, wherein the signal analysis module is configured to analyze the signal to determine parameters for learning the dictionary of basis functions.

21. A computerized method of transforming a signal representative of image information, the signal being a sparse signal, the method comprising:
   obtaining the signal;
   analyzing the signal to determine parameters for learning a dictionary of basis functions for the signal, wherein the basis functions represent at least part of the signal, wherein the parameters include at least one of a number of basis functions in the dictionary of basis functions and a sparsity level of the signal;
   estimating a representation of the signal;
   calculating an error between the signal and the representation of the signal;
   adjusting the parameters based on the calculated error;
   re-estimating the representation based on the adjusted parameters;

repeating the calculating, adjusting and re-estimating until the error is below an error threshold;

learning the dictionary of basis functions based on the determined parameters, wherein the dictionary is learned using a Beta process; and transforming the signal based on the learned dictionary of basis functions, wherein transforming the signal includes performing at least one of denoising, inpainting, and compressive sensing on the signal.

* * * * *